Patented Oct. 21, 1941

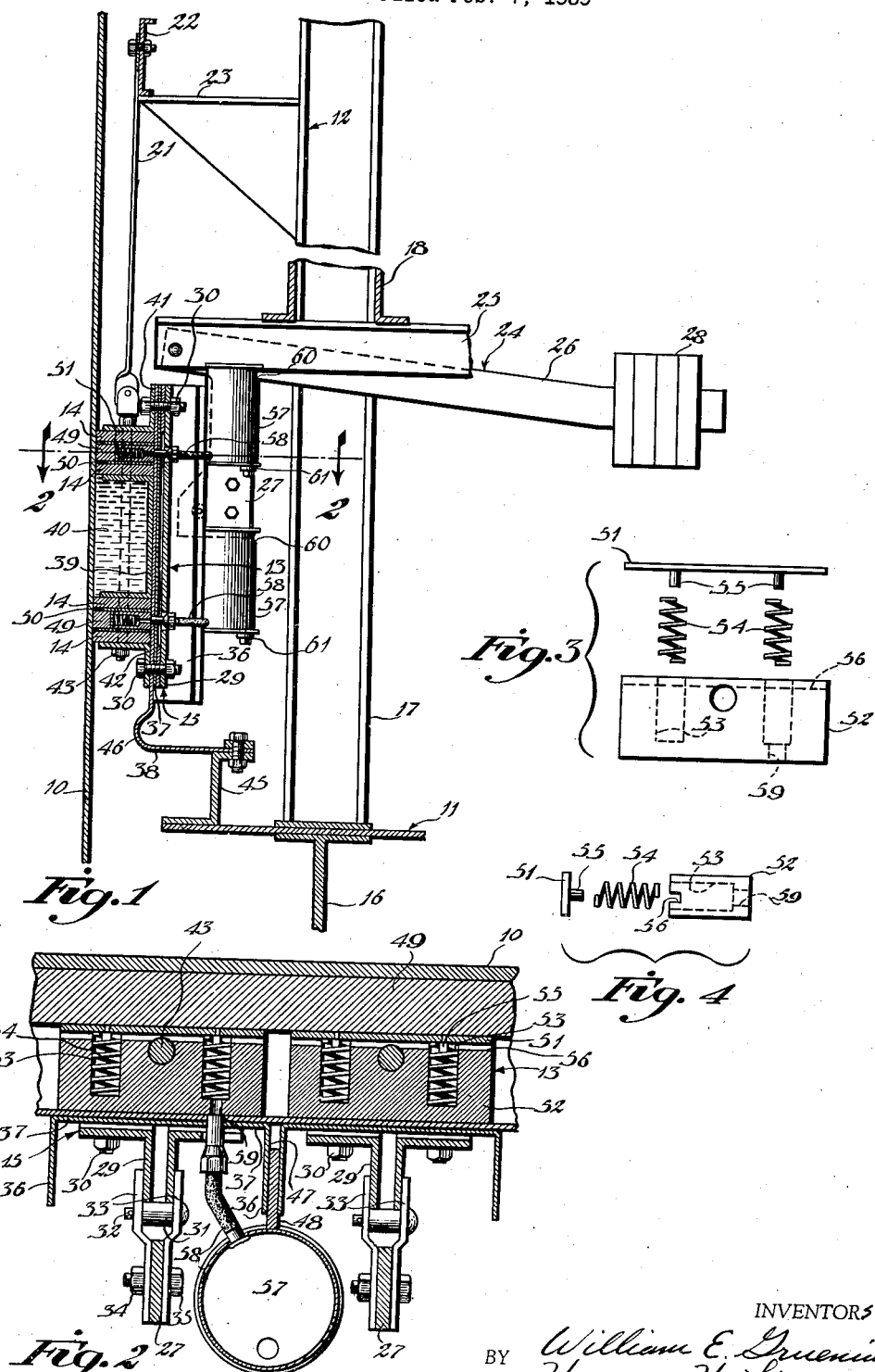

2,260,021

UNITED STATES PATENT OFFICE 2,260,021

SEALING MEANS FOR GAS HOLDER PISTONS

William E. Gruening and Herman H. Liese, Cincinnati, Ohio, assignors to The Stacey Brothers Gas Construction Company, Cincinnati, Ohio, a corporation of Ohio Application February 7, 1939, Serial No. 255,174

12 Claims. (Cl. 48—176)

This invention relates to gas holders and is particularly directed to improvements in the seal, which is disposed around the piston of the holder. This type of holder consists of a tank and piston disposed within the tank. The piston moves up and down in the holder, its position determined by the amount of gas in the holder. The piston, by virtue of its weight, maintains the gas under pressure.

These improvements relate more particularly to that type of sealing means for the piston which provides spaced sets of packing rings. These spaced sets of packing rings are held as a unit against the holder wall and the space between them is filled with a mobile medium consisting of a plastic such as a heavy colloidal solution of soaps and oils, or a fluid of the type exemplified by lubricating oil or some substance having an intermediate viscosity.

In the operation of this holder, a certain amount of friction developes between the shell and the packing, when the piston is moving up and down within the holder. This friction is minimized by the use of the mobile medium which is smeared on the holder wall in the movements of the piston. The friction, however, cannot be entirely economically eliminated. The packing, due to the friction, has a tendency to rotate or rock, and, when the piston is ascending, the pressure of the upper layers against the holder wall becomes slightly in excess of that of the lower layers or set of packing rings. When the piston is descending, the condition is reversed and the pressure of the lower set of rings is slightly greater than the upper.

The amount of lubricant, which is disposed on the shell or holder wall, depends upon the pressure of the packing. With a very light pressure, a large amount of lubricant is disposed on the holder and with heavy pressure, very little lubricant is deposited. It is therefore apparent that, due to the aforesaid rocking or rotating, the upper set of rings of the seal of the piston, when descending, would consequently allow a certain amount of lubricant to be deposited upon the holder, the amount being dependent upon the pressure.

Now, as the piston ascends, the pressure of the top layers becomes greater and these layers tend to clean or scrape the lubricant off the holder and the lubricant piles up on the top layers of the packing. The reverse is true for the bottom set of rings. In other words, in the instance of the lower set of rings, the lubricant is deposited on the shell when the piston is ascending and wiped off to a certain degree when it is descending.

It has been the object of the present inventors to reduce the loss of grease because of the aforesaid conditions. Toward this end, it has been the purpose to provide the top and bottom sets of packing rings with a predetermined constant pressure, so that these rings bear against the holder wall with equal force at all times, regardless of the direction of movement of the piston. For this purpose, each set includes outwardly pressed packing under predetermined constant pressure. The packing is free to move independently of the sealing unit, generally. The requisite pressure may be determined beforehand when the springs, or whatever pressure applying devices are used, are selected or adjusted to exert the proper force to prevent the passage of grease and, at the same time, permit relatively free unimpeded movement of the seal over the holder wall.

By this means, it is possible to control the amount of lubricant deposited upon the shell and the scraping tendency is eliminated. This is due to the fundamental proposition that the top and bottom sets of sealing rings are under constant predetermined pressure, irrespective of direction of piston movement.

It is preferable to seal the space in back of these outwardly pressed rings, since a gas leak might develop, particularly in the case of the lower rings. However, if this space is sealed, the rings might be held against free movement because of vacuum. Also, it is desirable to lubricate the upper and lower walls of the rings to provide for freedom of movement.

Therefore, it has been a further object of the present inventor to provide means for supplying oil or some mobile sealing, saturating or lubricating medium to the region of the outwardly pressed rings, whereby the mobile medium is constantly delivered and maintained in proximity to the rings and whereby the rings, in their movement, relative to the fixed rings of the seal, tend to draw in and expel the oil. Thus the spaces are sealed.

By this arrangement, the sealing units are fully lubricated at all times for their radial movements. At the same time, the rings are kept in a saturated condition for maximum sealing action.

Other objects and certain advantages will be more fully set forth in a description of the accompanying drawing in which:

Figure 1 is a fragmentary sectional view taken on a radial line through one side of the piston showing the improved sealing unit generally with respect to the holder wall.

Figure 2 is a sectional view taken on line 2—2, Figure 1.

Figure 3 is an exploded view, showing the elements constituting one unit of the pressure means.

Figure 4 is a side view of these elements.

In the embodiment of the invention disclosed herein, the packing or sealing rings are supported by means of a flexible, dilatable sheet metal ring unit, consisting of sections mounted on weighted levers and acted upon by the weights for the purpose of providing an efficient sealing contact of the sealing rings with the holder wall.

Referring to the drawing, the wall of the holder is indicated at 10 and the deck or piston generally at 11. A superstructure, generally indicated at 12, is provided as a part of the outer edge structure of the piston. This superstructure carries the sealing unit generally shown at 13. The sealing unit is fabricated of sealing rings 14 and the support sections 15.

It is not believed necessary to describe the structure of the piston and its superstructure in detail. This is only described to that extent believed necessary to set forth the mounting and environment of the sealing unit of this invention.

The piston proper may be stated to comprise a fabricated structure on which plates are mounted to make up a cup-shaped piston. The margin of the piston incorporates I-beams 16, which may be described as circumferentially arranged. A series of I-beams 17 rise above and are supported on these I-beams 16.

These vertical I-beams are braced relative to the piston or deck by means of angle iron brace elements extending to the top of the piston (not shown).

The uprights 17, are joined by angle or channel iron elements 18. The uprights 17 and cross-elements 18, form a vertical frame structure which supports the rollers (not shown), which engage the inner wall of the shell and form the guiding means for the piston, more specifically, the means for preventing tilting of the piston. The sealing unit is suspended on a plurality of straps 21 attached at their upper ends to circumferentially arranged channel iron elements 22 supported on shelves 23 of the superstructure of the piston.

The sealing unit 13 is pressed outwardly by means of levers 24 pivoted on the outer ends of angle iron elements 25. The elements 25 are extended radially and are attached to the under sides of cross-beams 18. Each lever 24 is of bell-crank form providing arms 26 and 27. The arm 26 of each extends horizontally and carries a plurality of weights 28 on its free end. The pivot for each lever is located approximately at the juncture of the arms thereof and through the outer end of the rail 25. The other arm 27 extends downwardly and is in contact with a respective section 15 of the dilatable ring. It will be understood, of course, that there are a multiplicity of these levers and sections distributed around the piston structure arm whereby the sealing unit is engaged at closely spaced intervals and the seal ring is presesd outwardly uniformly against the cylinder wall.

Pairs of angle iron brackets 29 are bolted vertically to the seal ring unit by bolts 30. The weighted arms 27 are engaged against the outer edges of the brackets by means of rollers 31 carried on pins 32 fixed between plates 33 straddling the brackets and fixed against the opposite sides of the lever arm 27 by means of bolts 34 and nuts 35 in each instance.

Describing one of the sections 15 in detail, it will be found, upon reference to the drawing, to consist of sheet metal of channel form providing side arms 36 and a base wall 37. The channel elements are disposed vertically with the arms projecting substantially radially toward the center of the piston. The base wall lies against the sheet fabric seal ring 38 disposed circumferentially of the holder.

The sealing rings 14 are in sets, upper and lower, spaced by means of a channel iron member 39. These sealing rings, in conjunction with the channel, form a space 40 for the mobile medium, which is adapted to saturate the seal or packing rings for maintaining the same in a pliant condition and for lubricating the holder walls.

Upper and lower angle iron elements 41 and 42 respectively extend circumferentially around the seal and are held together by draw bolts 43, clamping the packing rings 14 upon the channel iron element 39 and between angle iron elements 41 and 42. Each section 15 is secured to the angle iron pieces 41 and 42 by the bolts 30. The sheet fabric seal ring 38 is interposed between the assembly of sealing rings and the support sections and depends therefrom for attachment to a circumferentially arranged anchor rail 45. Attachment of the sheet fabric seal ring to the rail 45, is arranged so as to provide fullness in the sheet fabric sealing ring, as indicated at 46.

The circumferential width of each section is such as to provide spaces between the adjacent sections as indicated at 47. Plates 48 are attached between the adjacent arms of the sections.

In accordance with this invention, each set of packing rings includes a spring urged intermediate packing ring 49. This ring may be of the same material as that of the rings 14 above and below, namely layers of fabric. To avoid as much friction as possible, thin plates 50 are interposed between the intermediate section and the top and bottom sections or rings.

The actuators for the movable ring are in units, one adjacent each section of the ring. Each unit consists of a plate 51 lying against the back of the outwardly urged ring 49 and a spring retainer block 52, mounted between the plates 50, 50. This block includes two sockets 53. A coil spring 54 is disposed under compression within each socket and engages the plate. Studs 55 center the springs on the plate. A long groove 56 is formed across the forward face of the spring retainer block for the purpose of permitting flow of oil or air across the face of the block. Therefore, all of the spaces in back of the movable ring 49 are connected.

About every ten feet around the circumference, oil is fed to the space back of the ring. Upper and lower vertically disposed reservoirs 57 are welded to the edges of the plates 48 and the bottom of each reservoir is in connection with a particular retainer block through a conduit 58. Each conduit is tapped through the seal and enters the rear of one of the spring sockets through a passageway 59. The top of each tank is open as at 60 to permit the entrance of air, so that no vacuum may exist over the oil. These tanks are cleaned through cleanout plugs 61. The blocks are traversed by the vertical bolts, which hold the seal parts together and serve as spacers for the plates 50, 50 to maintain the proper space for the sliding relationship for the sealing ring 49.

In the operation of the seal, the spring actuated packing rings will move independently of the remaining layers or packing. The spring actuated rings may extend slightly beyond the face of the other packing rings due to inequalities or slight bulges in the holder or wall. Although the movement will be slow, it will tend to cause this portion of the seal to act as a pump and inasmuch as the space in back of this portion of the seal is air tight, a partial vacuum may be created by this movement. This will force the oil in and out of the oil reservoirs.

The plates 50 are bowed outwardly slightly at their outer circumferential margins. That is to say, the upper ring is bowed upwardly and the lower ring downwardly. Thus the space, within which the spring urged packing ring 49 moves, tends to open slightly toward the outer end and the packing ring moves more easily as it moves outwardly.

The straps 21, supporting the sealing unit, have their lower ends connected to bifurcated elements at the top of the draw bolts 43. The connection is pivotal and thus the sealing ring unit is hung or suspended in a position resting against the holder wall. The points of suspension are located relatively close to the holder wall. Thus, the contact of the sealing unit with the holder wall is uniform and there is less tendency for the unit to rock on the suspension means as the sealing unit is urged outwardly.

Having described our invention, we claim:

1. A sealing structure for the piston of a gas holder, said structure consisting of spaced circumferentially disposed laminated packing rings, said laminated packing rings including in each instance, an intermediate lamination adapted to move relative to the other laminations, and means for urging each intermediate lamination outwardly under predetermined pressure.

2. In a gas holder including a tank and a piston movable therein, a seal circumferentially disposed around the piston, said seal consisting of spaced packing rings, each packing ring including an intermediate layer, said layer movable outwardly against the holder independently of the ring, means for urging the ring outwardly, a reservoir for liquid connected to the space in back of each layer of each ring for supplying a lubricant to the space, and said spaces otherwise sealed.

3. A sealing unit adapted to be disposed around the piston of a gas holder, comprising upper and lower sets of packing rings, means for spacing said upper and lower sets of packing rings, an intermediate ring of each set movable radially with respect to the piston, guide plates above and below said respective intermediate rings, a plurality of spring retainer blocks disposed in the spaces in back of said movable rings, thrust plates adjacent the blocks and lying against the rings, springs in said retainer blocks engaging the plates for urging the movable rings outwardly, means for sealing said space, and means for supplying oil thereto.

4. A sealing unit adapted to be disposed around the piston of a gas holder comprising upper and lower sets of packing rings, means for spacing said upper and lower sets of packing rings, an intermediate ring of each set movable radially with respect to the piston, a plurality of spring retainer blocks disposed in the spaces in back of said movable rings, springs in said retainer blocks for urging the movable rings outwardly, and means for sealing said spaces.

5. In a gas holder including the tank and the piston movable in the tank, a seal circumferentially disposed around the piston, said seal consisting of spaced packing, each packing including a ring movable outwardly against the holder independently of the packing, spring means for urging the ring outwardly, an open reservoir for liquid connected to the space in back of each ring for supplying a liquid to the space, and said spaces otherwise sealed.

6. A sealing structure for the piston of a gas holder, said structure consisting of spaced circumferentially disposed packing rings, said packing rings including in each instance an intermediate packing ring adapted to move relative to the other rings of the set, the spaces containing said movable rings being sealed, means for urging said intermediate rings outwardly under predetermined pressure, and oil delivery means connected to each space.

7. In a gas holder tank, a piston movable up and down therein, a sealing unit disposed around said piston and lying against the wall of said tank, said sealing unit comprising upper and lower sets of packing rings, one ring of each set urged outwardly independently of the others, and means for supplying a sealing medium to the region of said last named ring.

8. In a gas holder tank, a piston movable up and down therein, a sealing unit disposed around said piston and lying against said holder, said sealing unit comprising upper and lower packing rings, and means providing independent radial movement of either the upper or lower rings, and means for sealing the spaces in which the rings move.

9. In a sealing unit adapted to be disposed around the piston of a gas holder, comprising spaced upper and lower sets of packing rings, an intermediate ring for each set movable laterally with respect to the piston, guide plates above and below said respective intermediate rings, said guide plates spread slightly relatively toward their outer ends, and means for urging said intermediate rings outwardly.

10. In a gas holder, a piston movable up and down therein, a sealing unit including rings disposed around the piston and lying against the wall of the holder, suspension means for said sealing unit for suspending the sealing unit relative to the piston, said suspension means disposed centrally of the radial dimension of the sealing rings and therefore relatively close to the holder wall, and means engaging said sealing unit for moving it outwardly against the holder wall on said suspension means.

11. A sealing structure for the piston of a gas holder comprising; vertically spaced packing rings, including in each instance, an intermediate lamination adapted to move radially and relatively to the other lamination of the set, guide plates for said intermediate lamination, and means for urging each intermediate lamination outwardly constantly.

12. In a gas holder including a tank and a piston movable in the tank; a sealing structure for the piston disposed in engagement with the holder wall, said sealing structure including upper and lower circumferentially disposed sealing ring units, said units spaced axially relative to the piston and including in each instance a ring section mounted for radial sliding movement relative to the balance of the ring units, and means for urging each section outwardly under pressure whereby said ring sections will remain in contact with the holder wall if the upper and lower units are tipped away from the tank wall.

WILLIAM E. GRUENING.
HERMAN H. LIESE.